United States Patent [19]

Bettridge et al.

[11] Patent Number: 4,988,575

[45] Date of Patent: Jan. 29, 1991

[54] METHOD OF PROVIDING TITANIUM AND ALLOYS THEREOF WITH A PROTECTIVE COATING

[75] Inventors: David F. Bettridge, Derby; Terence P. Cunningham, Nottingham; Brian W. Forman, Burton, all of England

[73] Assignee: Rolls-Royce plc, London, England

[21] Appl. No.: 408,450

[22] Filed: Sep. 15, 1989

Related U.S. Application Data

[63] Continuation of Ser. No. 237,712, Aug. 29, 1988, abandoned.

[51] Int. Cl.[5] .......................... C23C 8/10; B32B 9/00

[52] U.S. Cl. .................................. 428/469; 148/284; 148/DIG. 17

[58] Field of Search ................ 148/6.3, DIG. 17, 284; 428/469, 472, 472.1

[56] References Cited

U.S. PATENT DOCUMENTS

| | | | |
|---|---|---|---|
| 3,408,236 | 10/1968 | Hartesveldt | 148/6.3 |
| 3,472,704 | 10/1969 | Watson et al. | 148/6.3 |
| 4,154,897 | 5/1979 | Shimogori et al. | 148/6.3 |
| 4,478,648 | 10/1984 | Zeilinger et al. | 148/6.3 |

*Primary Examiner*—Stanley Silverman

*Attorney, Agent, or Firm*—Cushman, Darby & Cushman

[57] ABSTRACT

A method of providing a surface of titanium or an alloy thereof with a protective coating in which the surface is cleaned and then heated in clean air at a temperature within the range 500°-550° C. for a period of at least four hours.

6 Claims, 1 Drawing Sheet

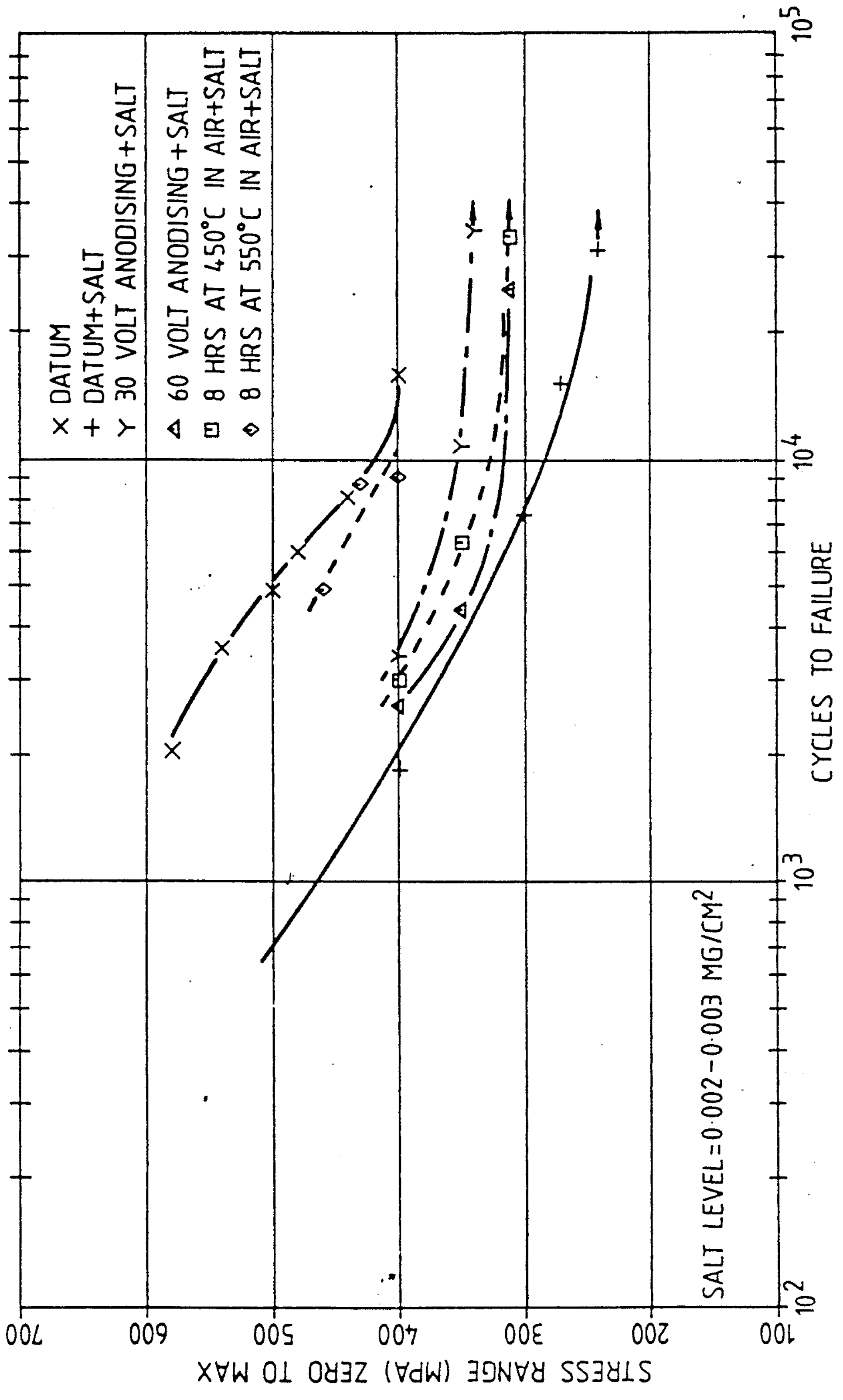
× DATUM
+ DATUM+SALT
Y 30 VOLT ANODISING+SALT
△ 60 VOLT ANODISING+SALT
□ 8 HRS AT 450°C IN AIR+SALT
◇ 8 HRS AT 550°C IN AIR+SALT
SALT LEVEL=0·002–0·003 MG/CM²
CYCLES TO FAILURE
STRESS RANGE (MPA) ZERO TO MAX
100
200
300
400
500
600
700
10²
10³
10⁴
10⁵

METHOD OF PROVIDING TITANIUM AND ALLOYS THEREOF WITH A PROTECTIVE COATING

This is a continuation of application Ser. No. 07/237,712, filed Aug. 29, 1988, which was abandoned upon the filing hereof.

This invention relates to a method of providing the surface of titanium and alloys thereof with a protective coating.

The high strength and low weight of titanium and titanium alloys make them highly suitable for use in the construction of, for instance, compressors for gas turbine engines. It has been found, however, that the increasingly demanding conditions under which certain titanium alloys are being required to operate can give rise to problems of stress corrosion cracking. This arises when areas of corrosion on the alloy surface act as sites for the initiation of cracks when the alloy component concerned is subjected the conditions of high temperature and stress.

The obvious solution to the problem of corrosion is to provide the alloy in question with a coating which is effective in inhibiting corrosion. However if the component formed from the alloy is of complex and/or fabricated construction, it can be extremely difficult to provide a protective coating which has total coverage. In the case of components of complex configuration, difficulty may be encountered in achieving the necessary coverage if the protective coating is applied by spray techniques. This problem may be overcome in the case of fabricated components if the separate elements of the fabrication are coated prior to fabrication. However it is almost inevitable that during the fabrication process, particularly if it involves welding or like techniques, areas of unprotected alloy surface will result adjacent the resultant joints.

It is an object of the present invention to provide a method of protecting the surfaces of titanium and alloys thereof from corrosion which can conveniently be applied even to components of complex configuration.

According to the present invention, a method of providing a component surface formed from titanium or an alloy thereof with a protective coating comprises the steps of subjecting said surface to a cleaning operation to remove any contaminants therefrom and subsequently heating said surface in clean air at a temperature within the range 500–550° C. for sufficient time to produce an adherent oxide layer on said surface which is capable of inhibiting any subsequent corrosion of said surface.

A convenient method of cleaning the alloy surface comprises removing any contaminants with a soap solution, rinsing the surface with cold water and then allowing the surface to drain. The surface is then rinsed in demineralised water before being placed in a warm oven to dry.

When the component having the alloy surface is clean and dry, it is carefully placed in a suitable air circulating oven ensuring that potential sources of contamination, such as finger prints or tap water, are prevented from coming into contact with the alloy surface. The oven concerned is specially prepared to ensure that it contains no contaminating materials. Thus the atmosphere within the oven is arranged to be dust-free and any fixtures etc within the oven to support the component are chosen so as to be contaminant-free.

The oven temperature is then raised until it reaches a level within the range 500-500° C. The temperature is maintained at that level to permit the growth of a protective oxide layer on the alloy surface. The temperature range of 500–550° C. is critical in that at temperatures below 500° C. the resultant oxide layer is not sufficiently thick to provide the necessary degree of protection against corrosion to the alloy surface. On the other hand, while temperatures above 550° C. do provide an oxide layer which provides the necessary degree of corrosion protection, it has been found that the alloy surface absorbs significant amounts of oxygen and nitrogen. Such absorption is looked upon as being undesirable in view of the detrimental effect which it can have upon the alloy surface Thus stabilisation of the alpha phase can occur and this can lead to adverse effects upon mechanical properties, particularly low temperature fatigue life. The oven is maintained at the appropriate temperature within the range 500–550° C. for sufficient time for an oxide layer to build on the alloy surface which provides the necessary degree of protection against corrosion. Generally speaking, the longer the alloy surface is heated, the thicker will be the resultant oxide layer. However we have found that the minimum time necessary to produce an acceptable oxide layer at 500° C. is 4 hours. Generally speaking we have found the best compromise between temperature and length of heat treatment to be a combination of heat treatment temperature of 525° C. and a heat treatment duration of four hours.

At temperatures of 550° C. and below, the rate of oxidation of the alloy surface has been found to be generally logarithmic. The oxide layer is of the n type and grows by the inward diffusion of oxygen through the oxide lattice.

In order to assess the effectiveness of the method of the present invention a series of test pieces formed from the alloy known as Ti 5331S were prepared. The alloy is supplied by Imperial Metal Industries and contains the following constituents by weight percent:

| | |
|---|---|
| Aluminium | 5.5% |
| Tin | 3.5% |
| Zirconium | 3% |
| Niobium | 1% |

Balance Titanium plus impurities.

One of the test pieces was set aside as a datum. All but one of the remaining test pieces were then treated by various methods in order to increase their resistance to corrosion. One test piece was treated in accordance with the present invention by heating it in air at a temperature of 550° C. for eight hours. A further test piece was treated by heating it in air at a temperature of 450° C. for eight hours and two test pieces were treated by the well known technique of anodising; one at a voltage of 30 volts and the other at a voltage of 60 volts.

All of the test pieces, with the exception of the datum test piece, where then sprayed with an aqueous sodium chloride solution to give a sodium chloride concentration of 0,002 to 0.003 mg/cm$^2$ whereupon the test piece was dried in a warm oven. The above mentioned sodium chloride is equivalent to that which has been measured on the surface of titanium compressor parts of gas turbine engines which have run in-service.

All of the test pieces including the datum, were then subjected to a test in which they were each exposed to a cycle of no load—tension for two minutes—no load for a total of $10^4$ cycles. The results of the tests are shown in the accompanying graph. As can be seen from the graph, the test piece which was treated in accordance with the present invention suffered the smallest reduction in strength. The full results were as follows:

| Test Piece | % Strength Reduction |
|---|---|
| Datum | 0% |
| Datum plus Sodium Chloride | 33% |
| Anodised (30 v) plus Sodium Chloride | 16% |
| Anodised (60 v) plus Sodium Chloride | 23% |
| Anodised 8 hours at 450° C. plus Sodium Chloride | 21% |
| Anodised 8 hours at 550° C. plus Sodium Chloride | 4% |

It is clear therefore that the test piece treated in accordance with the present invention suffered a reduction in strength as a result of stress corrosion which was significantly less than was the case with the next most effective treatment viz anodising at 30 volts. Although the present invention has been described with reference to a particular titanium alloy, it will be appreciated that it is also applicable to other titanium alloys as well as to titanium alone.

We claim:

1. A method of providing a component surface formed from titanium or a titanium based alloy having titanium as the major constituent thereof with a protective coating comprising the steps of subjecting said surface to a cleaning operation in order to remove any contaminants therefrom and subsequently heating said surface in clean air at a temperature within the range of 500–550° C. for sufficient time to produce an adherent oxide layer on said surface which is capable of inhibiting any subsequent corrosion of said surface.

2. A method as claimed in claim 1 wherein said component surface is heated at said temperature within the range 500–550° C. for a period of at least four hours.

3. A method as claimed in claim 1 wherein said component surface is heated at a temperature of 525° C. for a period of four hours.

4. A method as claimed in claim 1 wherein said component surface is cleaned by a process comprising washing said surface with a soap solution, rinsing said surface with water, draining said surface, rinsing said surface with demineralised water and finally drying said surface in a warm oven.

5. A method as claimed in claim 1 wherein said component is a portion of the compressor of a gas turbine engine.

6. A component surface treated in accordance with the method of claim 1.

* * * * *

UNITED STATES PATENT AND TRADEMARK OFFICE

CERTIFICATE OF CORRECTION

PATENT NO. : 4,988,575

DATED : January 29, 1991

INVENTOR(S) : BETTRIDGE, David, F.; CUNNINGHAM, Terence, P.; FORMAN, Brian, W.

It is certified that error appears in the above-identified patent and that said Letters Patent is hereby corrected as shown below:

In Col. 2, line 2, change "500-500°C to --500-550°C--.

Signed and Sealed this

Eighth Day of September, 1992

*Attest:*

DOUGLAS B. COMER

*Attesting Officer*

*Acting Commissioner of Patents and Trademarks*